United States Patent
Seehof

(10) Patent No.: US 10,559,218 B2
(45) Date of Patent: Feb. 11, 2020

(54) METHOD AND DEVICE FOR CONTROLLING A SIMULATOR

(71) Applicant: DEUTSCHES ZENTRUM FÜR LUFT-UND RAUMFAHRT E.V., Köln (DE)

(72) Inventor: Carsten Seehof, Braunschweig (DE)

( * ) Notice: Subject to any disclaimer, the term of this patent is extended or adjusted under 35 U.S.C. 154(b) by 332 days.

(21) Appl. No.: 15/551,715

(22) PCT Filed: Feb. 22, 2016

(86) PCT No.: PCT/EP2016/053655
§ 371 (c)(1),
(2) Date: Aug. 17, 2017

(87) PCT Pub. No.: WO2016/131986
PCT Pub. Date: Aug. 25, 2016

(65) Prior Publication Data
US 2018/0018896 A1 Jan. 18, 2018

(30) Foreign Application Priority Data
Feb. 20, 2015 (DE) .......... 10 2015 102 459

(51) Int. Cl.
*A63F 9/24* (2006.01)
*G09B 9/12* (2006.01)
*G05B 19/418* (2006.01)

(52) U.S. Cl.
CPC .......... *G09B 9/12* (2013.01); *G05B 19/41885* (2013.01); *G05B 2219/35009* (2013.01); *G05B 2219/50162* (2013.01)

(58) Field of Classification Search
CPC .......... B60T 8/4081; G09B 9/02; G09B 9/05; G09B 9/00
See application file for complete search history.

(56) References Cited

U.S. PATENT DOCUMENTS

| | | | | |
|---|---|---|---|---|
| 2003/0230137 | A1* | 12/2003 | Kemp | G01M 17/007 73/116.01 |
| 2004/0255661 | A1* | 12/2004 | Nagai | G01M 17/022 73/146 |
| 2015/0239442 | A1* | 8/2015 | Yamakado | B60L 3/102 701/70 |

FOREIGN PATENT DOCUMENTS

| | | |
|---|---|---|
| DE | 10 2011 103 736 A1 | 12/2012 |
| WO | 2007/042290 A1 | 10/2006 |

OTHER PUBLICATIONS

Stratulat et al., "Improving the Realism in Motion-Based Driving Simulators by Adapting Tilt-Translation Technique to Human Perception", Virtual Reality Conference, Mar. 19-23, 2011, pp. 47-50, Singapore.
Asadi et al., "Adaptive Translational Cueing Motion Algorithm Using Fuzzy Based Tilt Coordination", International Conference on Neural Information Processing, 2014, pp. 474-482.

* cited by examiner

*Primary Examiner* — Omkar A Deodhar
*Assistant Examiner* — Eric M Thomas
(74) *Attorney, Agent, or Firm* — W&C IP

(57) ABSTRACT

The present invention relates to a filter for controlling a simulator for the representation of movements of a simulated vehicle, the rotational and translational control commands required to control the simulator being calculated from a difference between the angle of rotation and the apparent vertical angle, taking into account a physiological rotation rate limitation.

9 Claims, 18 Drawing Sheets

METHOD AND DEVICE FOR CONTROLLING A SIMULATOR

The invention relates to a method for actuating a simulator for simulating translational and rotational movements of a vehicle. The invention likewise relates to a simulator and a computer program in this respect.

With the aid of simulators, it is possible to simulate movements of a vehicle in the real world such that the driver of the vehicle is provided with the feeling of in fact guiding a vehicle through the real world. Thus, for example, vehicle simulators are known from the prior art, in which an image projection device is arranged in the field of view of the driver, said image projection device displaying an image of the external surroundings of the vehicle to the driver. If the driver of the vehicle simulator now carries out control tasks, such as e.g. acceleration, braking or steering inputs, the image of the surroundings displayed on the image projection device is adapted and modified, depending on the control inputs, in a way corresponding to the control input.

In the stationary simulators, in which a simulation of the change and/or acceleration of the vehicle is only simulated by e.g. the presented external image and the change therein, simulators which, in addition thereto, comprise a movement system which is configured to simulate the arising movements and accelerations within the simulation in a defined movement space are also known. Here, depending on the simulator type, up to six degrees of freedom can be mapped within the movement space by the movement system, namely, firstly, three rotational movements and, secondly, three translational movements in relation to the three vehicle axes. Particularly when simulating aircraft, use is made of movement systems for the simulator that facilitate a mapping of the movement of the aircraft in all six degrees of freedom within the movement space, such as e.g. a hexapod platform.

The three vehicle axes are the longitudinal axis (x), the transverse axis (y), and the vertical axis (z).

The conventional simulation approach provides for the movement and/or acceleration values that are obtained by modeling the vehicle in the simulation to be mapped into the movement space of the movement system, wherein the high-frequency components of the translational accelerations and the high-frequency components of the rotational speeds are reproduced directly in the corresponding degrees of freedom. By contrast, the low-frequency components of the translational accelerations are represented by tilting the movement platform in relation to the perpendicular to the Earth, as a result of which the apparent gravitational vector within the cabin rotates. The remaining positioning representations that are available to the user, such as the external view or instruments, continue to describe the original positioning, and so the impression of a long-term translational acceleration arises.

However, in order to correctly present the low-frequency translational acceleration by tilting the movement platform in relation to the perpendicular to the Earth, it is necessary to ensure that the rotation or inclination of the simulation platform is below the perception threshold such that the vehicle driver only perceives the change in the apparent gravitational vector in the simulator and not the rotation of the simulator cabin itself. Otherwise, a simulation error arises during the cognitive processing by the vehicle driver, which may be uncomfortable and, in the worst case, lead to the so-called virtual reality sickness.

According to the current prior art, the acceleration signals that are provided by the simulation model are converted into actuator intended states of the actuators of the movement system by means of filter algorithms. These are converted into mechanical movements by the actuators and the actuation thereof. Often, use is made here of the classic washout filter algorithms (CWA: classic washout algorithm) and the latter is, by far, the filter applied most frequently in vehicle simulation.

FIG. 1 schematically shows the structure of a classic washout filter, as is known from the prior art. The specific forces which arise from the simulation model during the simulation of the vehicle are converted into translational accelerations, speeds and positions in the translational channel by means of a high-pass filter. The high-frequency components of the input signal are therefore represented correctly as the high-frequency components of the translational acceleration to be simulated are converted directly into translational acceleration of the movement system of the simulator. The restricting factor here is the available movement space, at the boundary of which the translational movement of the simulator cabin must have been terminated and the return movement to the initial position must have been initiated.

With the aid of a combination of a low-pass filter and a tilt coordination module, the specific forces in the tilt coordination channel are converted into positional angles. As a result of this, long-term translational accelerations can be presented under the condition that all further positional information items, such as external view, instruments, etc., continue to present the original positioning. The limit for this method lies in the perception threshold for the rotational movement. Observing this is ensured by a rotational rate limitation. The perception threshold must not be exceeded because, otherwise, contradictory perceptions lead to nausea which can worsen to become virtual reality sickness. Hence, it is possible to correctly present both very high-frequency and very low-frequency translational acceleration forces. By contrast, a compromise for the respective task always needs to be sought after in a mid-frequency range.

In the rotational channel, the incoming rotational rates, in a manner analogous to the translational channel, are converted by means of high-pass filters in such a way that the high-frequency rotational rate components are presented correctly. At the same time, infringing the movement space boundary should be prevented. The positioning angles of the simulator cabins that result as outputs of the tilt coordination channel and of the rotational channel are fed back into the translational channel in order, for example, to be able to present flight states such as a coordinated curved flight correctly. In a real aircraft, the coordinated curved flight is distinguished by rotational rates about the longitudinal axis without transverse forces being felt in the process. Hence, during the introduction in the rotational channel, the washout filter reacts with a rotational angle while no modified input signal is applied to the translational channel. Without feedback, this would lead to a transverse force in the simulator cabin as a consequence of the rotational angle. The feedback ensures that this lateral force is minimized by a compensation movement in the transverse direction.

It is possible, depending on set parameters, to adapt the washout filter to different flight states but simulator errors that occur, in particular on account of the compromise in the mid-frequency acceleration component, can only be minimized to an average extent. This means that the washout filter is adapted in advance to possible flight states to be expected and therefore only supplies an average result for other flight states.

DE 10 2011 103 736 A1 has disclosed a method for actuating a movement system of a simulator that is provided for simulating movement and/or acceleration values, wherein at least one acceleration value to be simulated is simulated by an inclination of the movement system in relation to the perpendicular to the Earth and an additional translational movement profile of the movement system is ascertained in order to compensate a simulator error up to the actuation of the positioning angle. Here, this actuation is effectuated as a function of a tilt profile and the additional translational movement profile, wherein, in principle, closed-loop control and hence the feedback of the movement system state is possible in this respect.

It is therefore an object of the present invention to specify an improved filter algorithm for actuating a simulator for simulating translational and rotational acceleration values, which avoids the disadvantages, known from the prior art, of a classic washout filter in particular.

This object is achieved according to the invention by the method in accordance with claim 1, by the simulator in accordance with claim 7, and in the computer program in accordance with claim 9.

Accordingly, provision is made, according to the invention, for a method for actuating a simulator for simulating translational and rotational movements of a vehicle, wherein, in relation to the three vehicle axes, a rotational rate about a first vehicle axis and the specific forces respectively acting along a second vehicle axis and a third vehicle axis are provided from a movement model that simulates the vehicle and converted into translational and rotational control commands for actuating the simulator.

Unlike in the washout filter known from the prior art, the movement system of the simulator is actuated in the present invention on the basis of the difference between the apparent perpendicular in the simulator cabin and the apparent perpendicular that is present in the simulated aircraft.

Initially, a rotational angle is calculated from the rotational rate about the first vehicle axis, which is provided by the movement model that simulates the vehicle. By way of example, this can be effectuated by means of an integration over time, wherein the rotational angle can be calculated from the rotational rate of the current time step.

Moreover, an apparent perpendicular angle between the vertical axis as third vehicle axis and the apparent perpendicular that is derivable from the forces is calculated, wherein the apparent perpendicular can be calculated from the provided specific forces along the second vehicle axis and the third vehicle axis. Hence, the apparent perpendicular angle is calculated in the plane that is spanned by the second vehicle axis and the third vehicle axis, between the vertical axis as third vehicle axis and the apparent perpendicular that results from the forces along the second vehicle axis and the third vehicle axis.

Subsequently, an apparent perpendicular angle difference is calculated from the rotational angle and the apparent perpendicular angle, said apparent perpendicular angle difference specifying that an implementation of the specific forces to be simulated and the rotational rate in the simulator would lead to a perception error. By way of the apparent perpendicular angle difference, it is possible to quantify the perception error that arises in the process, as a result of which the latter can be minimized by further filtering.

Now, a high-frequency difference component of the apparent perpendicular angle difference is ascertained from the apparent perpendicular angle difference, said difference component being intended to be compensated by a translational movement of the simulator. By way of example, this can be achieved by virtue of the apparent perpendicular angle difference being filtered by a high-pass filter, such as e.g. a second or third order high-pass filter, in order thus to determine the high-frequency difference component of the apparent perpendicular angle difference. This high-frequency difference component, which may lie above the perception threshold in the case of an implementation by means of rotating the simulator cabin and which may, as a consequence, have a perceptible force that should be compensated by a translational movement of the simulator in the simulator cabin, is now used to calculate, in a manner dependent thereon, the translational control commands for actuating the simulator for translational movement of the simulator along the second vehicle axis. In a simple case, this may be determined, for example, from the sum of the gravitational acceleration (g) and the sine of the high-frequency difference component of the apparent perpendicular angle difference, as a result of which a translational movement along the second vehicle axis of the simulator arises.

In order to actuate the rotational degrees of freedom of the simulator, a compensation angle, which corresponds to an acceleration value to be simulated along the second vehicle axis by inclining the simulator in relation to the perpendicular to the Earth, is now calculated on the basis of the previously calculated rotational angle, the high-frequency difference component of the apparent perpendicular angle difference, and the apparent perpendicular angle itself. By way of example, this compensation angle may also be 0 if there is no acceleration value to be simulated which could be simulated by inclining the simulator in relation to the perpendicular to the Earth, which is the case, for example, in the case of a coordinated curved fight.

Expressed differently, there are no errors for as long as the rotational rates in the aircraft and in the simulator have the same magnitude and there is no need for limitation. In this case, the compensation angle is 0. A limitation is only required if the rotational rates are different. In that case, the compensation angle is greater than 0.

If the compensation angle is greater than 0, the compensation angle is limited by means of a physiological rotational rate limitation, wherein the rotational rate limitation limits an inclination of the simulator or a rotation of the simulator below the perception threshold, to the extent that this is desired, such that a limited compensation angle is derived from the calculated compensation angle.

Subsequently, the rotational control commands for actuating the simulator for a rotational movement of the simulator about the first vehicle axis are calculated by combining the limited compensation angle and the previously calculated rotational angle. By way of example a rotational angle about the first vehicle axis, which the simulator should then actuate, then emerges in the current time step from the calculation of the rotational control commands.

Where this is possible on account of the system design, the present invention renders it possible to update the input variables exactly or in the correct direction. The determination of the positioning angle and the intended position of the simulator cabin is then effectuated by way of the apparent perpendicular angle of the aircraft to be simulated, with only the load multiple along the vertical axis not being able to presented correctly on account of the system design. In relation to the prior art, the method according to the invention offers the advantage of being able to identify the residual error that is not optimizable for all cases on account of the system design in the prior art ("curve on the ground") and of being able to process this in the best possible way, without disadvantages arising in the signals that are used in an ideal manner on account of the system design. Since the present method uses an exact movement equation, the filter can be used for longitudinal and sideways movements.

A further advantage consists of the fact that, on account of the same input signals into the filter, the present method can be used immediately in the majority of the operational simulators.

In order to ascertain the high-frequency difference component of the apparent perpendicular angle difference, it is advantageous to calculate the latter by means of a high-pass filter. Frequencies above a limit frequency are passed in an approximately non-attenuated manner by means of a high-pass filter, while lower frequencies are damped or blocked. Therefore, by way of the high-frequency difference component of the apparent perpendicular angle difference, the output of the high-pass filter provides that component of the apparent perpendicular angle difference which can be compensated by means of a translational movement of the simulator. Hence, it is initially possible to compensate part of the incorrect perception impression, which would arise on account of the apparent perpendicular angle difference, by means of the translational movement of the simulator.

The translational control commands for translational movement of the simulator along the second vehicle axis can then advantageously be calculated from the product of the gravitational acceleration and the sine of the ascertained high-frequency rotational angle component of the apparent perpendicular angle difference. The result is a translational movement along the second vehicle axis in the coordinate system that is stationary in relation to the vehicle, as a translational control command that can then be entered into the control logic of the simulator for actuating the actuator lengths.

In order to calculate the compensation angle by means of which, in particular, the low-frequency acceleration values along the second vehicle axis should be mapped by inclining the simulator in relation to the perpendicular to the Earth, it is advantageous if said compensation angle is calculated from the sum of the rotational angle and the high-frequency difference component of the apparent perpendicular difference minus the apparent perpendicular angle. The compensation angle is then entered into a physiological rotational rate limitation, by means of which the compensation angle is restricted to a limited compensation angle in the current time step in order thus to restrict inclination of the simulator below the perception threshold.

Equivalently, this could also be realized by means of a low-pass filter, which obtains the apparent perpendicular angle as an input and which is complementary to the high-pass filter.

Then, the rotational control commands for rotational movement of the simulator about the first vehicle axis are calculated from the sum of the limited compensation angle and the current rotational angle. By way of example, the result can be a rotational angle to be approached, which is intended to be approached by the simulator in the current time step.

In an advantageous embodiment, the limited compensation angle is calculated by means of the physiological rotational rate limitation depending on, firstly, the compensation angle and, secondly, the rotational rate provided by the movement model. By means of the physiological rotational rate limitation, the compensation angle to be approached for the purposes of simulating acceleration values is restricted to an angle in the current time step by inclining the simulator, said angle lying below the perception threshold of the human when approaching this angle within the current time step. Hence, the approach of the limited compensation angle leads to an inclination of the simulator which the occupants of the simulator do not perceive as a rotation about the vehicle axis, said occupants only perceiving the changing weight force vector as a translational acceleration.

In order hence to obtain an ideal result, even in the case of high rotational rates, and in order to prevent the rotational rate limitation from no longer operating synchronously with the forces to be simulated, a restriction value, by means of which the compensation angle is limited in the current time step, is ascertained depending on a predetermined minimum restriction value and a high-frequency rotational component of the rotational rate. Hence, in the case of high rotational rates, the rotational rates are limited and increased for a certain time after the event such that the simulator implements the high rotational rates as quickly as possible, even with a possible acceptance of a simulation error.

In principle, a rotational rate limitation is not wanted if the rotational rates of the aircraft and simulator cabin are the same. In this case, a rotation would also be perceivable in the aircraft. In the case of a coordinated curve flight, this rotation cannot be tracked long-term, for the aforementioned reasons, without building up a resultant force that deviates from the aircraft such that, as a consequence, the rotational angle needs to be returned before the simulator cabin reaches the movement space boundaries as a consequence of the translational compensation acceleration. Hence, the rotational rates of aircraft and simulator cabin deviate from one another during the second part of the maneuver, necessitating an intervention of the rotational rate limitation.

In accordance with claim 7, a simulator for simulating translational rotational movements of a vehicle is provided, wherein a control unit is present, said control unit being configured to carry out the aforementioned method for actuating the simulator. Advantageously, the simulator can be a hexapod, which is also referred to as a Stewart-Gough platform.

The invention is explained in an exemplary manner on the basis of the attached figures. In detail:

FIG. 1 shows the basic structure of a classic washout algorithm, as is known from the prior art. Here, high-frequency translational accelerations are directly converted into a translational movement of the simulator, while low-frequency translational acceleration values are mapped by way of an inclination of the simulator cabin (tilt coordination channel).

FIG. 2 shows the basic illustration of the apparent perpendicular filter according to the invention for a lateral movement. In the general form, the input variables for the apparent perpendicular filter are the specific forces $$\vec{f}_{aa} = \vec{a}_{aa} - \vec{g}_{PA} = \begin{pmatrix} f_{aa,x} \\ f_{aa,y} \\ f_{aa,z} \end{pmatrix} \tag{1}$$

Figure 1:
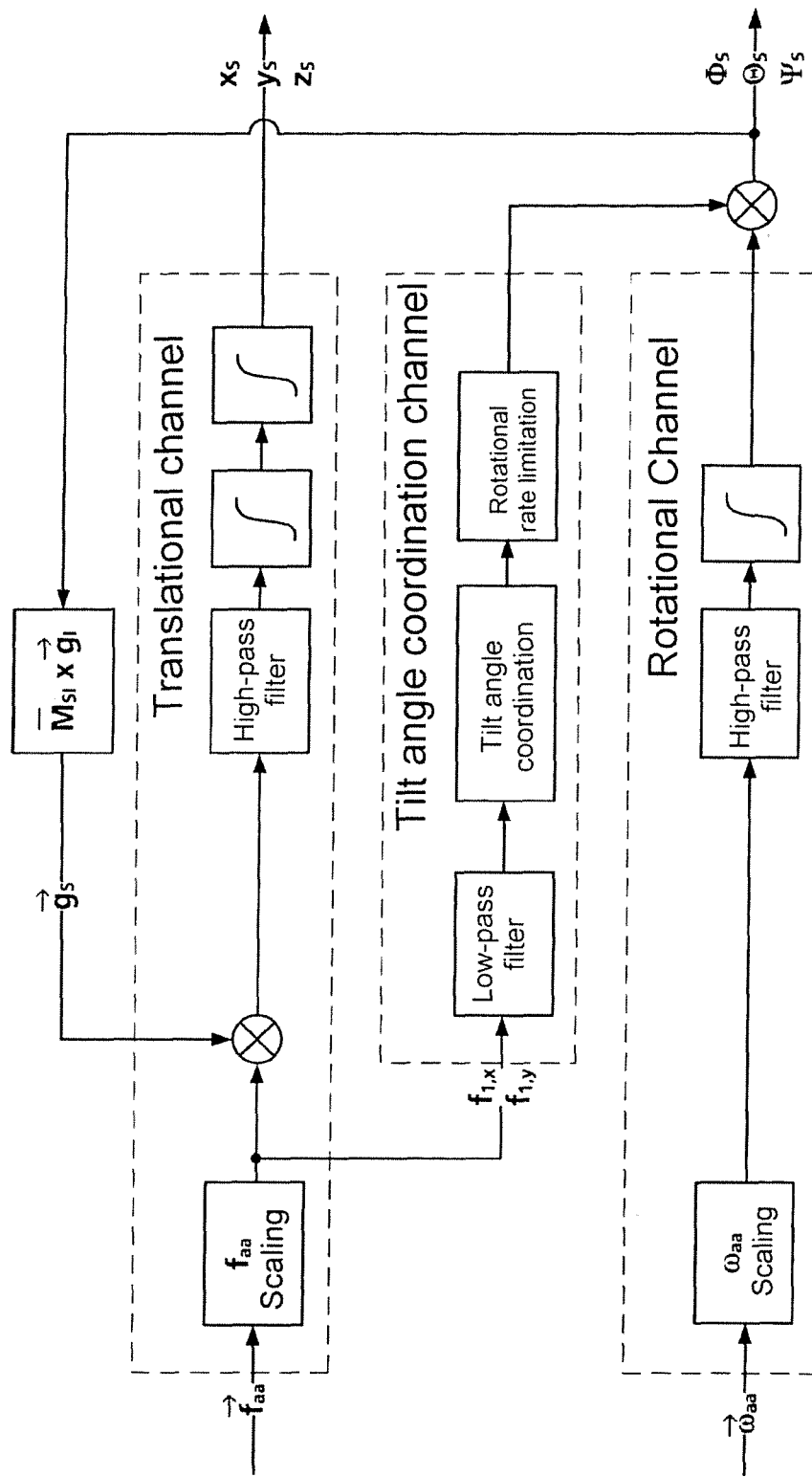
FIG. 1 shows a basic illustration of the classic washout filter algorithm (prior art)

and the rotational accelerations $$\vec{\dot{\omega}} = \begin{pmatrix} \dot{\omega}_{aa,x} \\ \dot{\omega}_{aa,y} \\ \dot{\omega}_{aa,z} \end{pmatrix} \tag{2}$$

or, alternatively, the rotational speeds $$\vec{\omega} = \begin{pmatrix} \omega_{aa,x} \\ \omega_{aa,y} \\ \omega_{aa,z} \end{pmatrix} \tag{3}$$

of the simulated aircraft.

In the aircraft, the apparent perpendicular angle is composed of the component as a consequence of additional forces and the component as a consequence of an angular position $$\vec{\varphi}_{PA} = \begin{pmatrix} \vartheta_x \\ \varphi_y \end{pmatrix}_{PA} = \vec{\varphi}_{t,PA} + \vec{\varphi}_{\omega,PA}. \tag{4}$$

In the individual rotational axes, the apparent perpendicular angles emerge via $$\begin{pmatrix} \tan(\vartheta_x) \\ \tan(\varphi_y) \end{pmatrix}_{PA} = \begin{pmatrix} \frac{f_{aa,x}}{f_{aa,z}} \\ \frac{f_{aa,y}}{f_{aa,z}} \end{pmatrix}_{PA} \tag{5}$$

to form $$\vec{\varphi}_{PA} = \begin{pmatrix} \vartheta_x \\ \varphi_y \end{pmatrix}_{PA} = \begin{pmatrix} \arctan\left(\frac{f_{aa,x}}{f_{aa,z}}\right) \\ \arctan\left(\frac{f_{aa,y}}{f_{aa,z}}\right) \end{pmatrix}_{\omega,PA}. \tag{6}$$

The first term from formula 4 emerges from the translational acceleration of the aircraft. These values are not explicitly available when transferring the specific forces. However, by rewriting formula 4 as $$\vec{\varphi}_{t,PA} = \vec{\varphi}_{PA} - \vec{\varphi}_{\omega,PA}, \tag{7}$$

they are establishable and can be determined with the aid of the overall angle $$\vec{\varphi}_{PA} = \int \vec{\omega}_{aa}. \tag{8}$$

The second component emerges from the angular position of the aircraft and the gravitational acceleration:

$$\vec{f}_{\omega,PA} = \begin{pmatrix} f_x \\ f_y \\ f_z \end{pmatrix}_{\omega,PA} = \begin{pmatrix} \sin(\theta_{PA}) \\ -\sin(\phi_{PA}) \cdot \cos(\theta_{PA}) \\ -\cos(\phi_{PA}) \cdot \cos(\theta_{PA}) \end{pmatrix} \cdot g, \tag{9}$$

from which the apparent perpendicular angles $$\vec{\varphi}_{\omega,PA} = \begin{pmatrix} \vartheta \\ \varphi \end{pmatrix}_{\omega,PA} = \begin{pmatrix} \arctan\left(\frac{f_x}{f_z}\right) \\ \arctan\left(\frac{f_y}{f_z}\right) \end{pmatrix}_{\omega,PA} \tag{10}$$

are establishable. Hence, the two input variables are completely available.

Equivalently, the aforementioned equations could also be established for the simulator cabin in order to determine the difference from the apparent perpendicular of the aircraft and the forces that act on the pilot.

$$\vec{\varphi}_{PS} = \begin{pmatrix} \vartheta_x \\ \varphi_y \end{pmatrix}_{PS} = \vec{\varphi}_{t,PS} + \vec{\varphi}_{\omega,PS} \tag{11}$$

Both terms are available for the simulators. From this, the specific forces in the follow-up rotation of the simulator cabin emerge as $$\vec{f}_{\omega,PS} = \begin{pmatrix} f_x \\ f_y \\ f_z \end{pmatrix}_{\omega,PS} = \begin{pmatrix} \sin(\theta_{PS}) \\ -\sin(\phi_{PS}) \cdot \cos(\theta_{PS}) \\ -\cos(\phi_{PS}) \cdot \cos(\theta_{PS}) \end{pmatrix} \cdot g, \tag{12}$$

from which the apparent perpendicular angles in the follow-up rotation of the simulator cabin $$\vec{\varphi}_{\omega,PS} = \begin{pmatrix} \vartheta \\ \varphi \end{pmatrix}_{\omega,PS} = \begin{pmatrix} \arctan\left(\frac{f_{PS,x}}{f_{PS,z}}\right) \\ \arctan\left(\frac{f_{PS,y}}{f_{PS,z}}\right) \end{pmatrix}_{\omega} \tag{13}$$

can be determined. The following applies to the translational acceleration in the coordinate system that is fixed relative to the cabin:

$$\vec{f}_{t,PS} = \begin{pmatrix} f_x \\ f_y \\ f_z \end{pmatrix}_{t,PS} = \begin{pmatrix} \ddot{x} \\ \ddot{y} \\ \ddot{z} \end{pmatrix}_f. \tag{14}$$

From this, the following follows for the apparent perpendicular angles in the simulator cabin:

$$\vec{\varphi}_{t,PS} = \begin{pmatrix} \vartheta \\ \varphi \end{pmatrix}_{t,PS} = \begin{pmatrix} \arctan\left(\frac{f_x}{f_z}\right) \\ \arctan\left(\frac{f_y}{f_z}\right) \end{pmatrix}_{t,PS}. \quad (15)$$

Using the relationships shown above, the input variables are initially converted either into an angle or into a specific force. For a rotational speed at the input, this is brought about by a simple integration, and by a double integration in the case of a rotational acceleration. Now, the obtained angle can be converted into a specific force by means of formula 10, provided that the apparent perpendicular filter should be set up as an equivalent with the aid of the forces.

Figure 2:
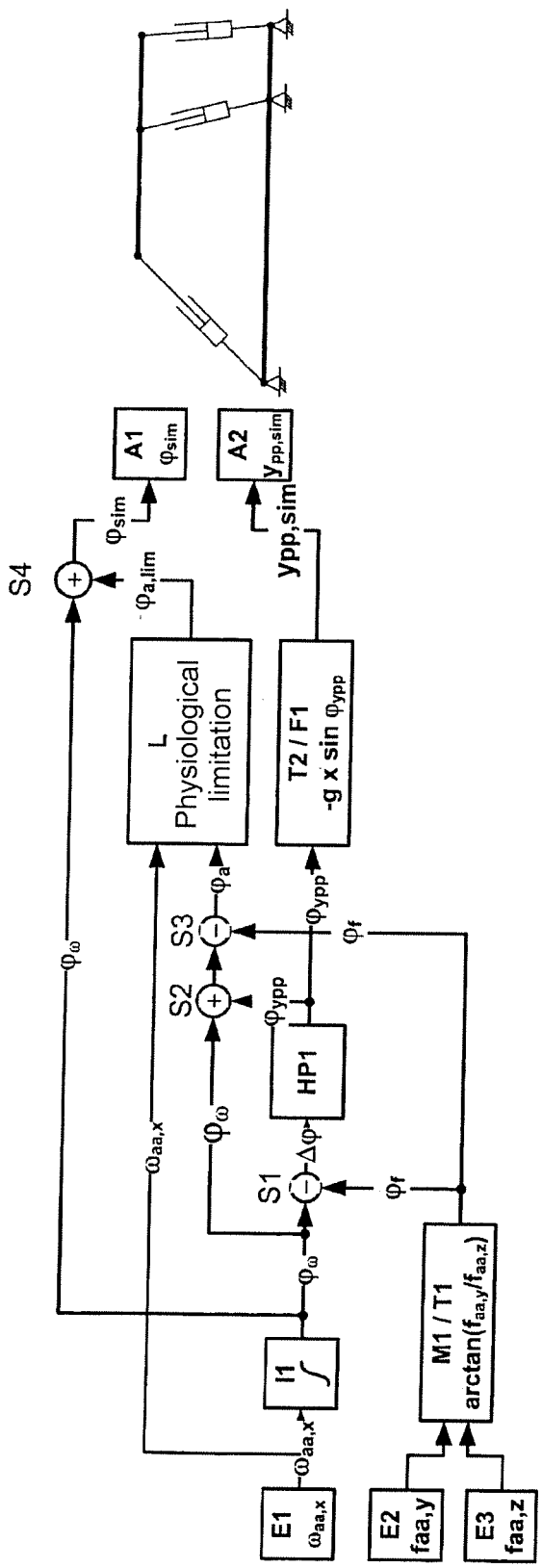
FIG. 2 shows a basic illustration of the apparent perpendicular filter according to the invention for a lateral movement.

Here, FIG. 2 shows a basic structure of the present invention for the lateral movement. The longitudinal movement can be implemented in a manner analogous thereto without problems. The relationships between rotational position and translational acceleration, which are yet to be discussed below, apply both to the lateral movement and to the longitudinal movement in this case, and so the relationship between roll position and lateral acceleration is analogous to the relationship between pitch angle and longitudinal acceleration.

In principle, three relevant flight states for the lateral movement which are relevant to the actuation of the simulator can be identified:

Case 1: Level flight with the constant roll position (suspended area)
Case 2: Driving a curve on the ground
Case 3: Coordinated curve in flight with simultaneous roll position of the aircraft In case 1, an apparent perpendicular angle in the aircraft is established due to transverse force on the basis of the roll position in level flight. In case 2, an apparent perpendicular angle is likewise present, said apparent perpendicular angle being based on the centrifugal force when driving through the curve on the ground. In the case 3, there is, in principle, no apparent perpendicular angle since the transverse forces cancel on account of the coordinated curve with the simultaneous roll position of the aircraft.

In principle, two degrees of freedom, the roll angle and the lateral acceleration, are usable for representing apparent perpendicular angles. Both are subject to restrictions. Thus, an acceleration in the lateral direction quickly leads to the arrival at the boundary of the movement space, whereas, by contrast, a representation by way of the roll angle at low frequencies is possible, but perception thresholds may possibly need to be observed, the latter preventing a quick representation of a transverse force.

Since, both the aircraft and the simulator cabin simply have to be rotated about the longitudinal axis for case 1, this case is, in principle, exactly representable by the simulator. Thus, the first component for the roll angle of the simulator cabin is the roll angle of the simulated aircraft.

By contrast, no transverse forces and hence no apparent perpendicular angles arise in this case for the roll position of the aircraft for case 3. If the simulator cabin in this case also follows the roll angle of the aircraft, the difference between the two transverse forces would lead to an apparent perpendicular angle in the simulator cabin which does not exist in the aircraft. Accordingly, this difference must be subtracted again from the first component of the roll angle. If this were carried out without further measures, the simulator cabin would remain stationary.

Hence, the apparent perpendicular angle would be represented correctly. However, the perception of the rotational speed during the entry into the curve is lacking in this case. A roll movement is initiated by way of a suitable manipulation of the apparent perpendicular angle difference in order to excite said perception, for example by way of a high-pass filter. However, in the case of the lateral movement, this roll movement leads to a lateral acceleration impression, the sign of which is in the wrong direction. This can be compensated by an opposing lateral acceleration of the simulator cabin while observing the boundaries of the movement space. Since the latter is quickly reached, the roll speed must be terminated again quickly. As a result of the corresponding movement in the lateral direction and in the roll direction, this can be carried out without the incorrect perception of movement. At the beginning, the rotational rates are deliberately above the perception threshold. By contrast, the return rotation must occur below the said perception threshold. As long as this is successful, the apparent perpendicular angle in the simulator cabin corresponds to that of the aircraft. Only the rotational rates differ and the best possible correction of the roll angle has been found.

Initially, no solution is possible for case 2 in the case of a sudden increase in the lateral force as a consequence of an occurring centrifugal force. Since the aircraft on the ground only carries out very small roll movements about the longitudinal axis, a sudden rotation of the simulator cabin must lead to a significant deviation between the acceleration impression in the aircraft and in the simulator. In the present invention, this deviation is determined by the difference of the already set roll angle and the apparent perpendicular angle in the aircraft on account of a lateral force. This difference must correspond to the component of the centrifugal acceleration on the apparent perpendicular angle. This difference is implemented by a limitation function.

On account of the system design, there is no ideal solution in the simulator to the problem of representing quickly occurring and long-term transverse forces due to a centrifugal force. At best, an adaptation of the filter properties to the maneuvers to be carried out and, ideally, the avoidance of perceptions with the wrong sign are possible. In the present invention, the optimization can be carried out in the limitation function. This is expedient since the necessary rotational rate limitation represents a cause of the error. Here, there are far-reaching options for adapting the system reaction, for example by way of increasing the rotational rate limitation after fast maneuvers or in the case of high workloads on the pilots. Consequently, a good compromise between observing the perception threshold and a fast representation of the acceleration can be found for every maneuver. Since the two other cases are already represented correctly as far as this is possible, there is no feedback of the settings found here on other cases. Hence, the last component for the roll angle is also found.

The functionality of the present invention is explained on the basis of an exemplary embodiment of FIG. 2 for the transverse movement. The basic structure can also be transferred to the longitudinal movement without restrictions. All that changes are the relationships between angular positions and accelerations.

For the following exemplary embodiment in the transverse direction, the specific forces along the vertical axis (z-direction/E3) and along the transverse axis (y-direction/E2), and the roll rate (E1) of the simulated aircraft are provided. The component of the apparent perpendicular angle in the plane spanned by the vertical axis and transverse axis as a consequence of translational accelerations is then calculated as:

$$\varphi_f = \arctan\left(\frac{f_{aa,y}}{f_{aa,z}}\right), \tag{16}$$

wherein the apparent perpendicular angle represents a deviation between the vertical axis of the vehicle in the coordinate system that is stationary in relation to the vehicle and the perceived acceleration vector. In FIG. 2, the calculation is represented by M1/T1.

Furthermore, the incoming roll rate at the pilot seat is integrated, represented by E1, and so the roll angle of the simulated aircraft can be determined by means of:

$$\varphi_\omega = \int \omega_{aa,x} dt. \tag{17}$$

After all input signals were converted into angles, the actual filter is set up. The angular position $\varphi_{sim}$ (A1) and the translational acceleration of the simulator cabin $y_{pp,sim}$ (A2) are obtained as output signals.

The angular position of the simulator in this case corresponds to the sum (S4) of the positional angle of the aircraft $\varphi_\omega$ and a limited compensation angle $\varphi_{A,lim}$. The former corresponds to the converted rotational speed input signal $\omega_{aa,x}$. The latter corresponds to the limited compensation angle with which the simulator cabin should be tilted for representing long-term translational accelerations in relation to the perpendicular to the Earth.

Without further filter components, this signal can map the first case, i.e. the state of a roll position with suspended areas, in a complete and error-free manner.

By contrast, for case 3, i.e. for representing the acceleration impressions in a coordinated curve, the rotational angle that builds up in the simulator cabin $\varphi_\omega$ as result of the roll movement must be compared to the apparent perpendicular angle of the aircraft $\varphi_f$ (S1). In this case, the two angles will deviate from one another since the apparent weight force points directly in the direction of the z-axis (vertical axis) in the aircraft on account of centrifugal forces. This force is missing in the simulator. The difference of both (S1) could now simply be added to the roll position and the apparent perpendicular is correct at all times. However, the perceivable roll movement in the simulator is also missing in this case since the cabin would simply remain still.

On the other hand, an increasing roll angle in the cabin leads to a transverse force with an inverted sign. This can easily be seen from formula 10. Therefore, the only possibility is that of returning the roll angle again that arises after a brief roll movement with the correct sign and thus of compensating, to the greatest possible extent, the error arising as a result thereof on account of the increasing roll angle by way of an appropriate translational movement or acceleration. This is carried out by way of a high-pass filter (HP1), by means of which the apparent perpendicular angle difference $\Delta\varphi$ (S1) is manipulated. The result is a high-frequency difference component $\varphi_{ypp}$ of the apparent perpendicular angle difference in the direction of the roll speed of the aircraft $\Delta\omega_{aa,x}$. By way of example, these can be input into a third order high-pass filter, which returns the roll position of the simulator cabin back into the zero position.

An apparent perpendicular with an incorrect sign also arises in the simulator cabin during this maneuver. The cabin is accelerated in the opposite direction in order to compensate this. Here, the movement space in the translational direction is the limiting factor. Thus, the aforementioned high-pass filter must be designed in such a way that these boundaries are not infringed. In addition to the high-pass filter, the effects of a signal may likewise be manipulated by way of a proportionality factor. Moreover, it is conceivable to use further options in the translational movement space to the best possible extent.

Now, a back conversion into translational accelerations by means of $$y_{pp,sim} = -g \cdot \sin(\varphi_{ypp}) \tag{18}$$

(T2/F1) is still required for the output signal $y_{pp,sim}$ (A2). As a result of the corresponding signals in the roll direction and y direction, the apparent perpendicular in the simulator cabin continues to be represented correctly if the boundary of the movement space is observed. Hence, in this case, the sum in S2 of the roll angle of the simulator cabin as a consequence of a roll movement of the aircraft ($\varphi_\omega$) and the roll angle of the simulator cabin as compensated by a translational acceleration along the transverse axis $\varphi_{ypp}$ corresponds to the apparent perpendicular angle of the aircraft, as ascertained by formula 16.

For the second case, a curve on the ground, the rotation of the apparent perpendicular does not correspond to a roll movement of the aircraft. As a consequence, an apparent perpendicular angle is present directly after entering the curve. The simulator cabin could follow said apparent perpendicular angle but the rotational movement would be detected by the pilot. Since the acceleration perception would then be contrary to the correct positional information items, dizziness or far-reaching consequences would be expected.

Since the apparent perpendicular in the aircraft arises without a rotation about the roll axis, a difference is obtained at the first comparison point (S1) in a manner analogous to case 3. This once again leads to a non-high-frequency difference component $\varphi_{ypp}$ at the output of the high-pass filter HP1, followed by a compensation function in the translational direction $\varphi_{ypp,sim}$.

However, this time, the sum of the roll angle $\varphi_\omega$ and the high-frequency difference component $\varphi_{ypp}$ at the output of S2 does not correspond to the apparent perpendicular angle in the aircraft $\varphi_f$. The difference between the two variables is formed in the difference unit S3 and the former corresponds to the compensation angle $\varphi_a$. Now, a correction is possible if the perception threshold is observed. Unlike in the first case and the third case, there cannot be a conversion of the signals with the correct apparent perpendicular apart from movements that can be converted below the perception threshold. All that can be attempted is to obtain the best possible result by way of a skillful limitation (L), the result of which is the limited compensation angle $\varphi_{a,lim}$.

Figure 3:
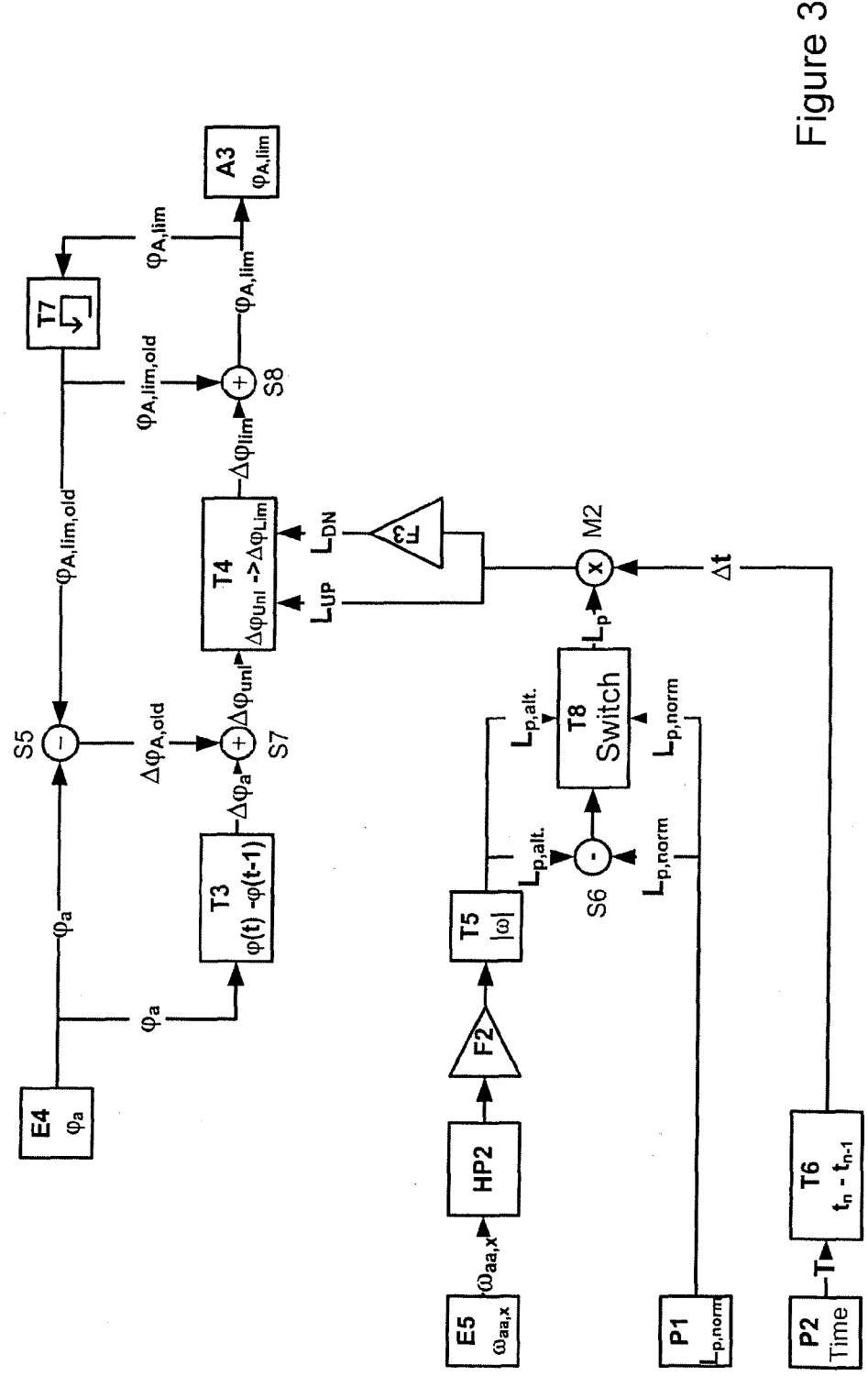
FIG. 3 shows the basic structure of the physiological rotational rate limitation for a lateral movement.

FIG. 3 shows, in an exemplary manner, an embodiment of the rotational rate limitation. The limitation has an obligatory input E4, by means of which the compensation angle $\varphi_a$ is provided, and the input E5 for transferring the roll speed $\omega_{aa,x}$. The latter only serves to adapt the limit values and can, as desired, be replaced with other available information items for optimizing the rotational rate limitation or else be omitted.

Moreover, the two parameters P1 for the smallest limit value $L_{p,norm}$ and P2 for the current system time T are included in the function.

The rotational rate limitation is increased for a certain time after the event in the case of quickly changing rotational speeds by way of the high-pass filter HP2 and the factor F2. By calculating the magnitude at T5, the absolute limit value $L_{p,alt}$ is obtained. On the other hand, P1 sets a minimum value $L_{p,norm}$ for the perception threshold. In principle, this parameter, too, is changeable depending on the situation. By way of the comparison at S6 and the selection T8, the respectively larger value is selected as an absolute value for the maximum admissible rotational rate $L_p$. The length of the time step δt is obtained by forming the difference between the current system time T and the preceding system time T at T6. Multiplying said time step by the admissible rotational rate (M2) leads to the upper limit of the current angular change $L_{UP}$ and, after multiplication by the factor −1 (F3), to the lower limit of the current angular change $L_{DN}$.

The accompanying compensation angle $\varphi_a$ is compared at T3 with, firstly, the value from the preceding step such that the result is angle change $\Delta\varphi_a$ calculated for the current time step. Secondly, $\varphi_a$ is compared to the entire angle difference between the current value and the overall value $\varphi_{A,lim,old}$ calculated for the preceding time step (S5). The result is the angle $\Delta\varphi_{A,old}$ that remains from preceding time steps. The latter is added to the current angle step (S7), and so the still to be traveled, unlimited angle difference $\Delta\varphi_{uni}$ is available. At T4, the latter is restricted to the admissible value range using the limit values $L_{UP}$ and $L_{DN}$ in $\Delta\varphi_{lim}$. This limited angle difference is added to the overall angle $\varphi_{A,lim,old}$ in S8. The result is the limited compensation angle $\varphi_{A,lim}$. The latter is, in turn, stored in T7 for the next time step.

Case 1: Level Flight with Constant Roll Angle (Suspended Area)

Figure 4:
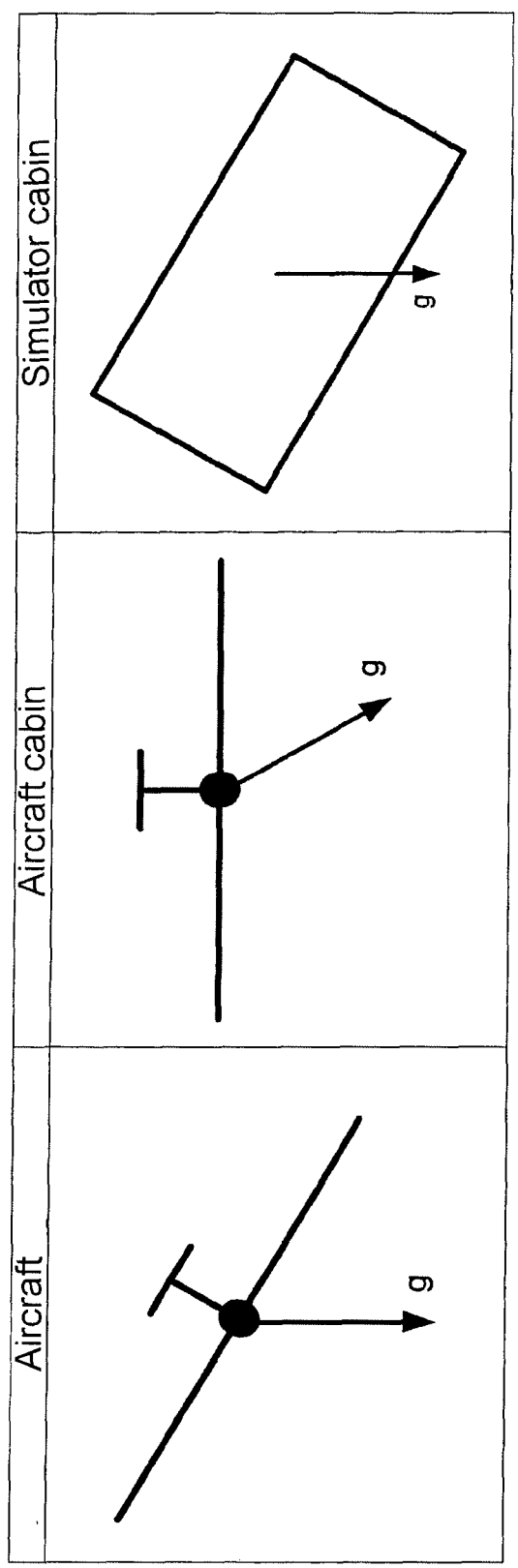
FIG. 4 shows a schematic illustration of the apparent perpendicular during level flight with constant roll angle (suspended area)

FIG. 4 schematically shows the apparent perpendicular and apparent weight vector in level flight with constant roll angle from various perspectives. Shown on the left is the aircraft as it would look to an external observer in this flight state if it were standing on the ground. Here, the apparent perpendicular corresponds to the perpendicular to the Earth. However, a different picture emerges for the pilot from the view of the aircraft cabin. As a result of the constant roll angle, the effect on the pilot in his "aircraft cabin" reference system is as if a transverse force were to act on the pilot in the direction of the roll angle by way of said constant roll angle.

In order to map this by the simulator, it is sufficient if the simulator cabin is rotated in accordance with the rotational angle, with there being an appropriate adaptation of the interior display. Since the roll movement of the aircraft can be traced by the simulator without losses, an identical movement is possible here, without an incorrect movement impression arising.

Figure 5A:
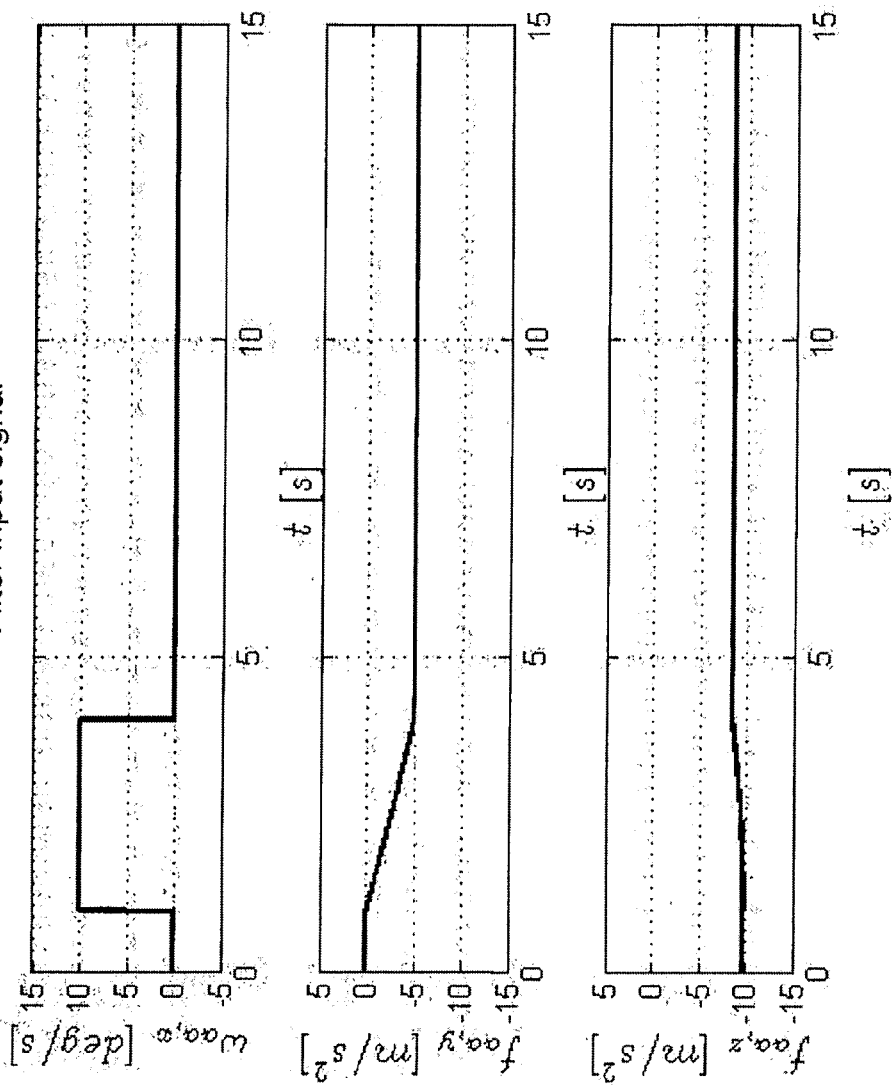
FIGS. 5a to 5d show illustrations of various signal curves for the flight state of the hanging area.

FIG. 5a shows the corresponding input signals for this example. Here, the upper image shows the rotational rate until the final angle is reached, followed by the specific forces along the transverse axis and the specific forces along the vertical axis.

Figure 5B:
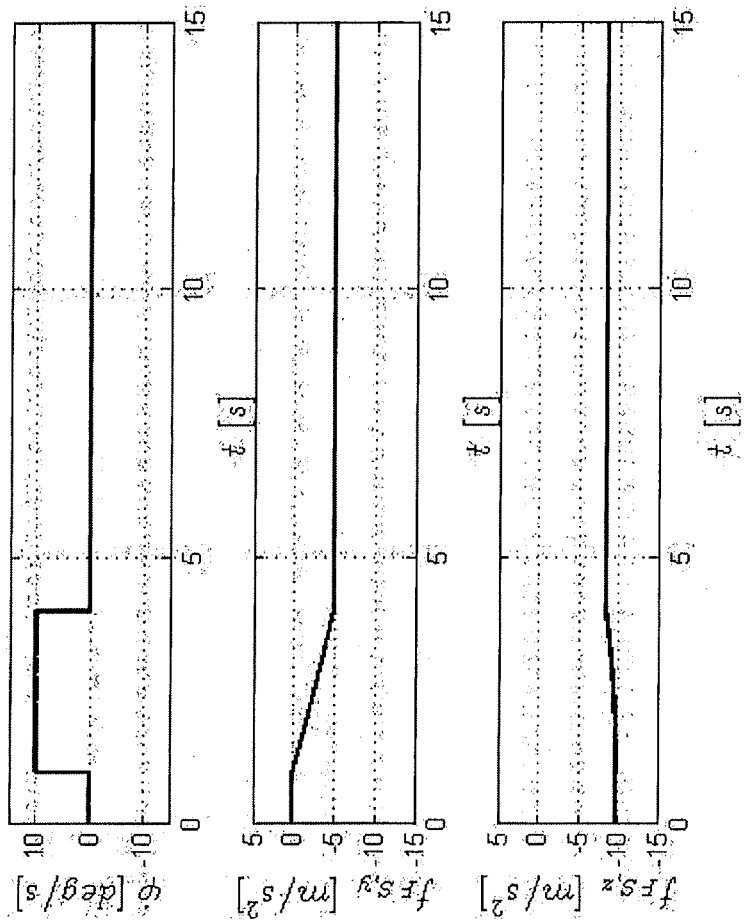
Figure 5C:
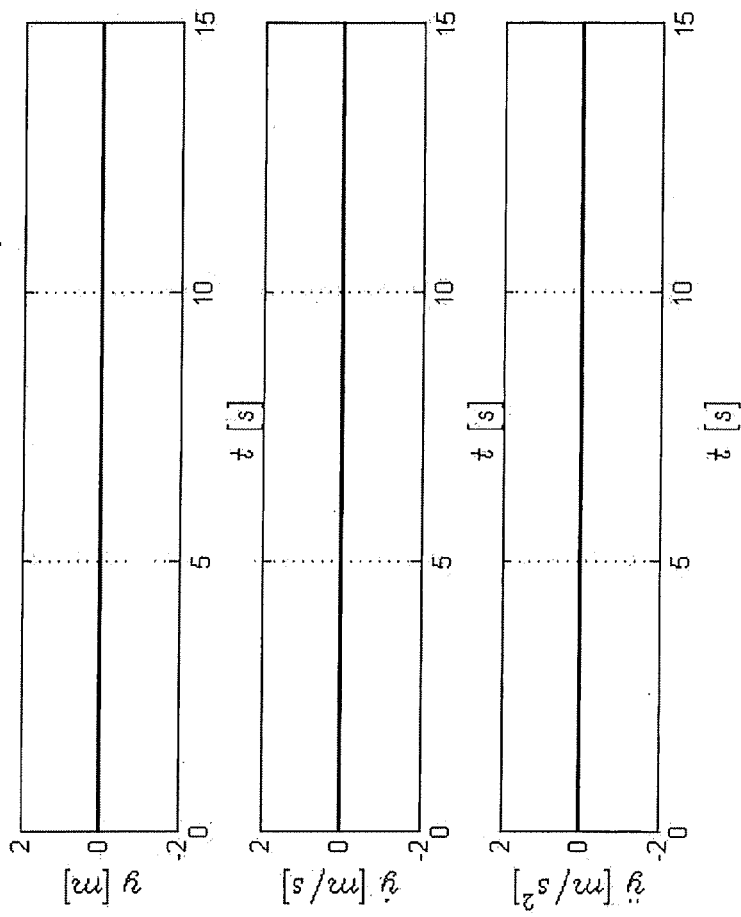

The output signal for actuating the simulator in accordance with the present invention is shown in FIG. 5b. Here, FIG. 5c shows a conversion of the output signal for the translational movement into position (upper presentation), speed (central presentation), and acceleration (lower presentation). It is possible to see that no translational acceleration or movement of the simulator for simulating the flight state is necessary in this case.

Figure 5D:
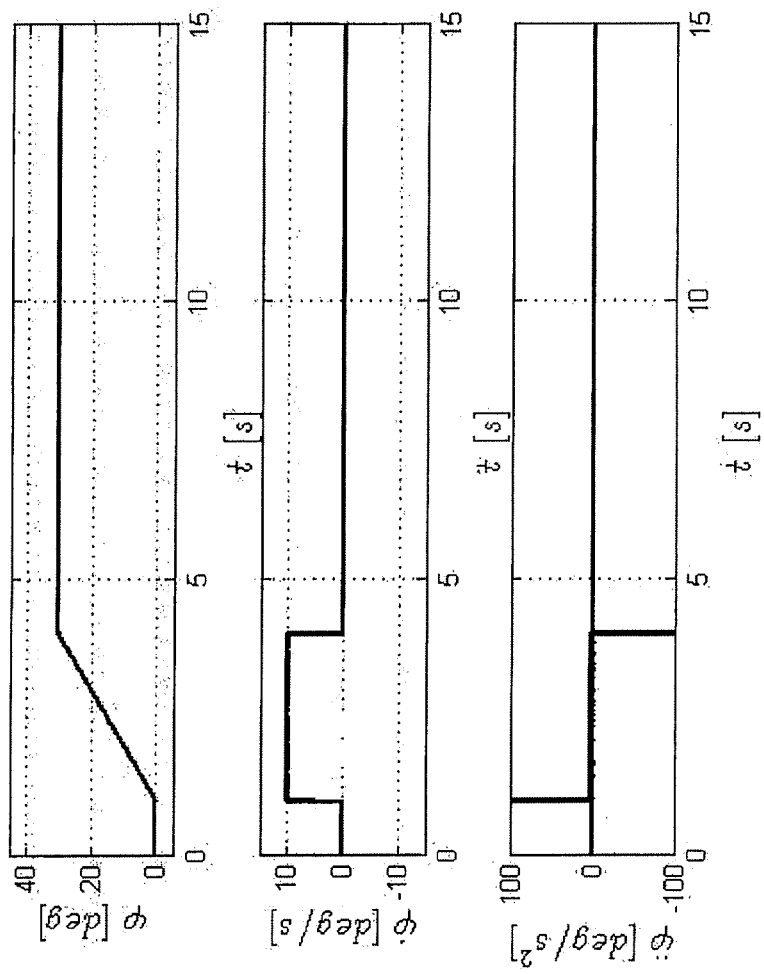

Finally, FIG. 5d shows the output signal as a rotational angle (upper image), rotational rate (central image), and rotational acceleration (lower image). It is possible to identify, in particular from the upper presentation, that a continuous change in angle over time can be approached without losses.

Case 2: Curve on the Ground

Figure 6:
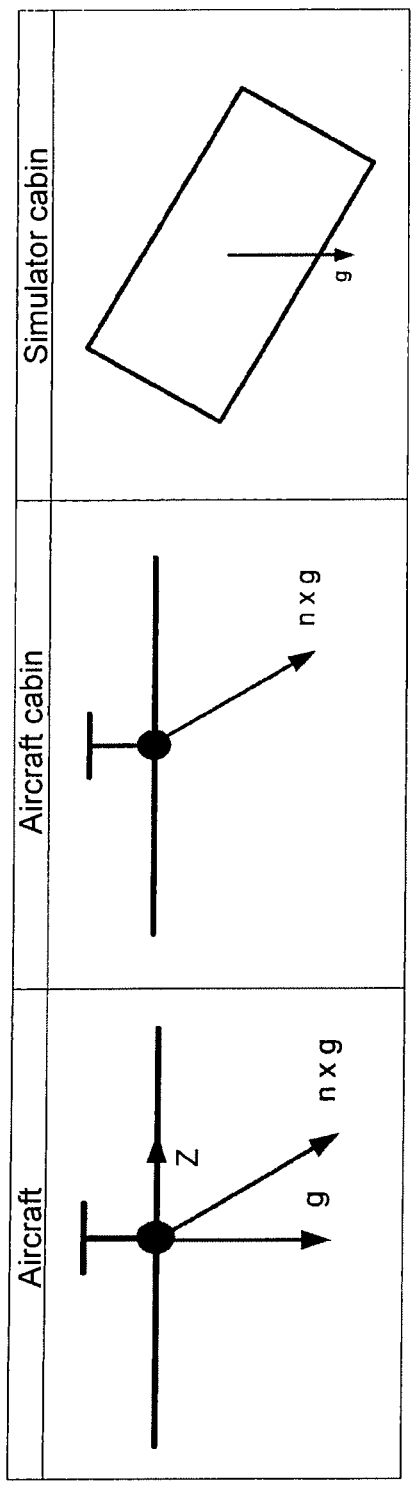
FIG. 6 shows a schematic illustration of the apparent perpendicular during a curve on the ground.

FIG. 6 schematically shows the case of a curve on the ground in the same way. In the case of a curve on the ground, centrifugal forces which rotate the apparent perpendicular vector in a manner similar to a curved flight arise in addition to the gravitational acceleration. However, virtually no roll angle can be set, leading to a transverse force that is perceivable in the aircraft cabin. In simulators, this transverse force is, in turn, represented by a rotation of the cabin. This leads to a difference in the roll movement between aircraft and simulator cabin, which, ideally, must be implemented below the perception threshold. In addition to the general problem of the load multiplication, this leads to errors during entry and exit processes. There may even be acceleration impressions with the wrong sign, in particular as a result of the fast return of the acceleration by means of a filter function on account of the restricted movement space.

On the left, the aircraft is once again shown from the outside, said aircraft being aligned horizontally but the weight vector deviating from the perpendicular to the Earth. This can be identified in the central image, which shows the forces from the view of the aircraft cabin.

In order to implement this in the simulator cabin, the simulator cabin is rotated below the perception threshold while the entire display of the instruments and the external representation in the cabin continues to maintain a horizontal alignment. The result is the perception of a centrifugal force that is based on gravitational acceleration.

Figure 7A:
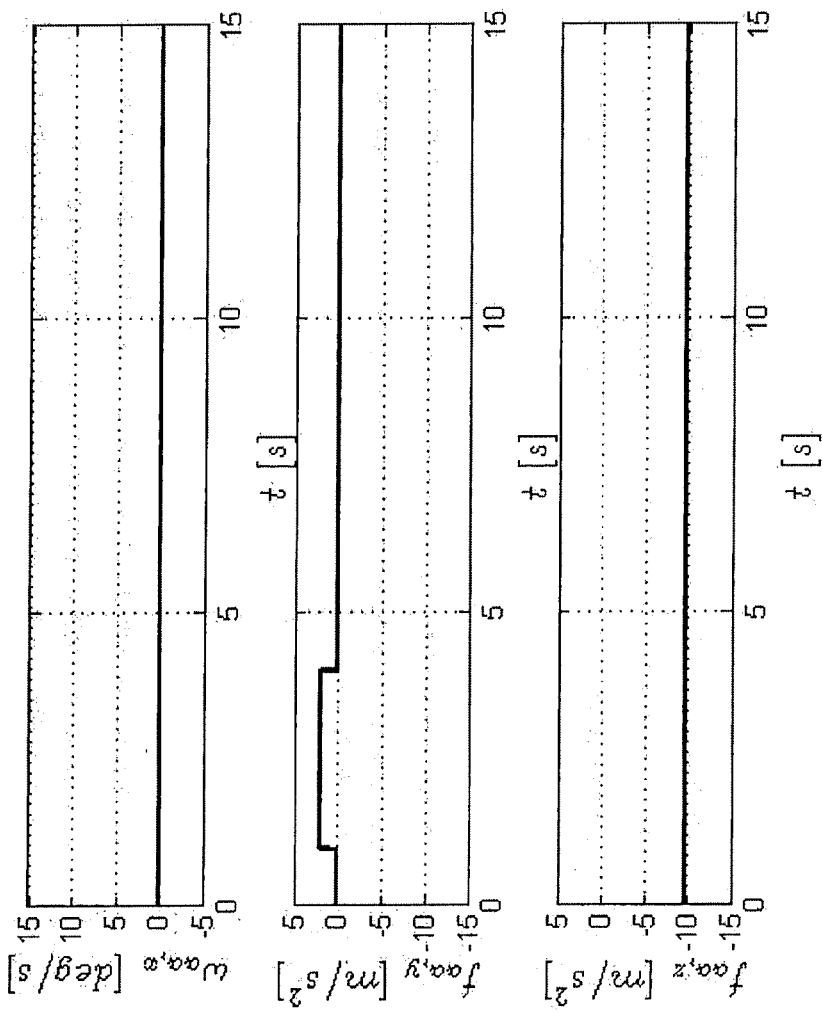
FIGS. 7a to 7d show signal curves of the flight state of the curve on the ground.
Figure 7B:
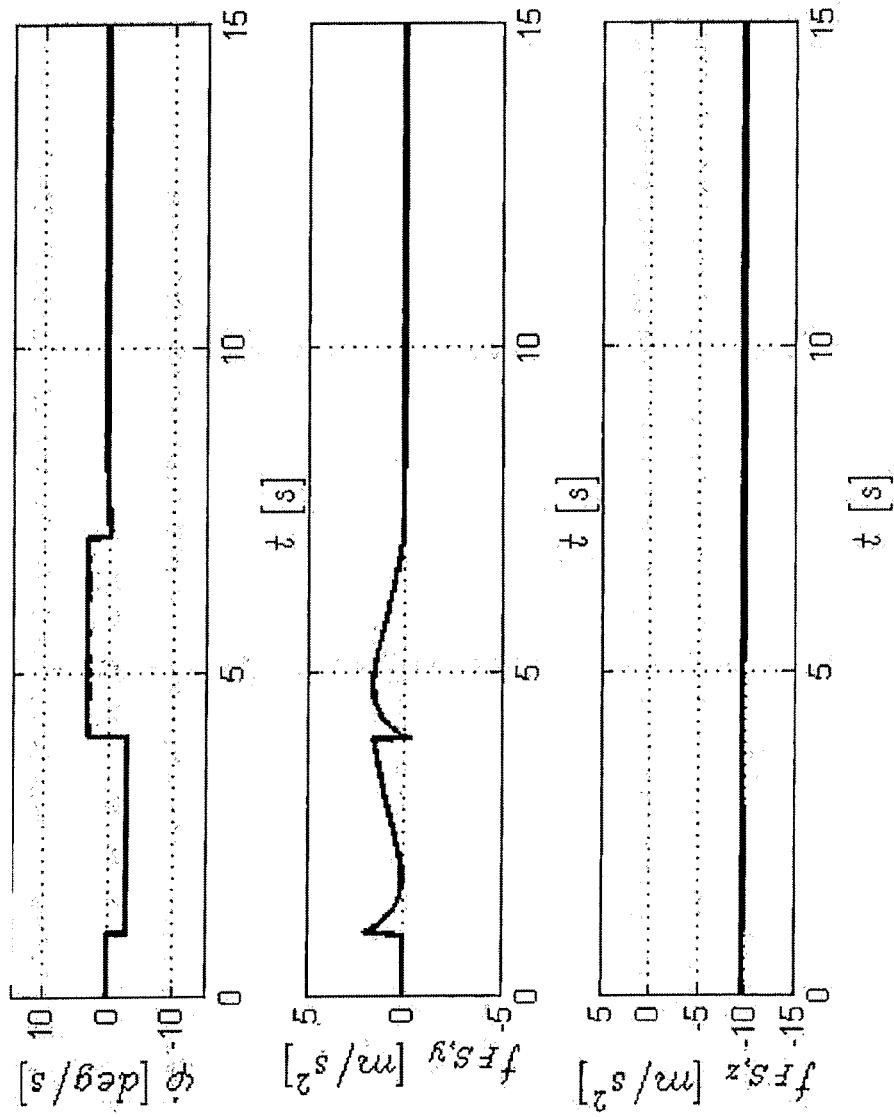
Figure 7C:
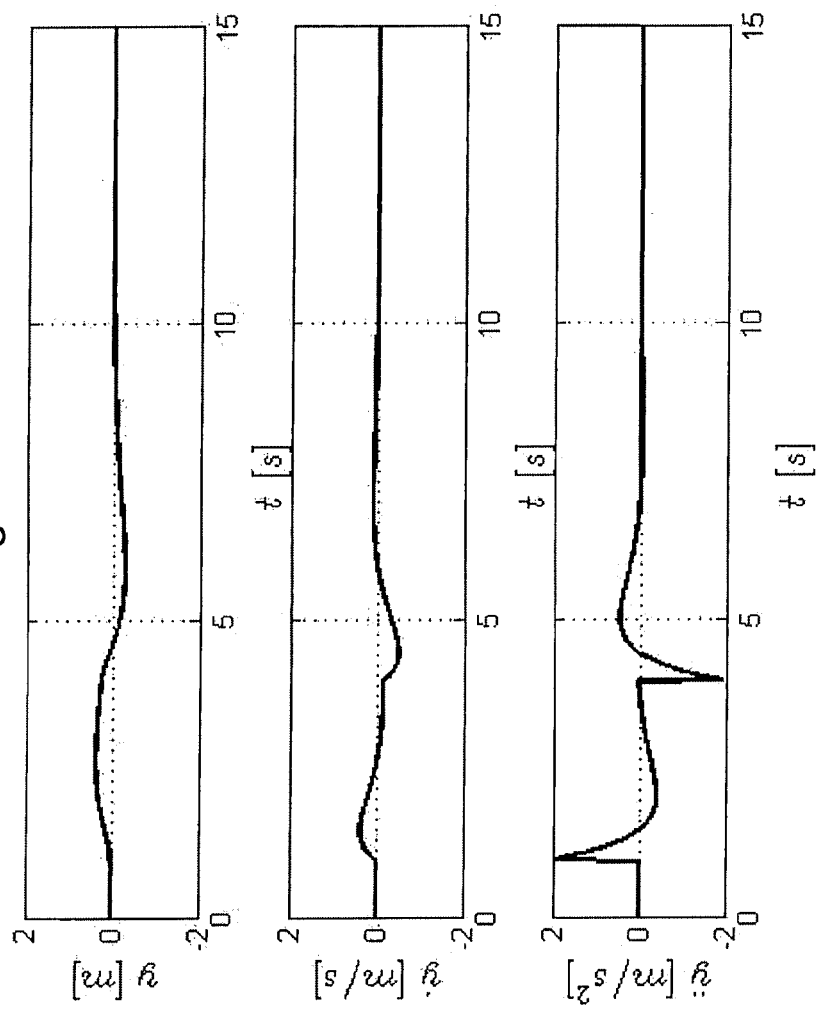
Figure 7D:
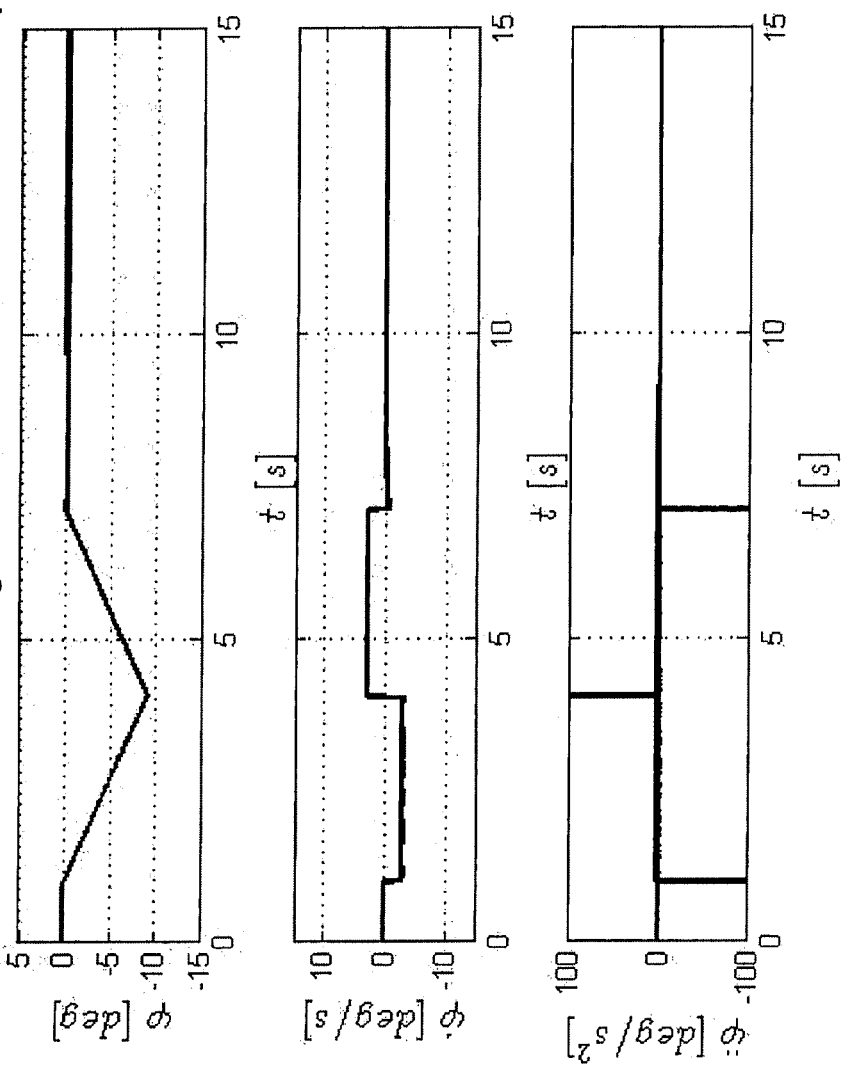
Figure 8:
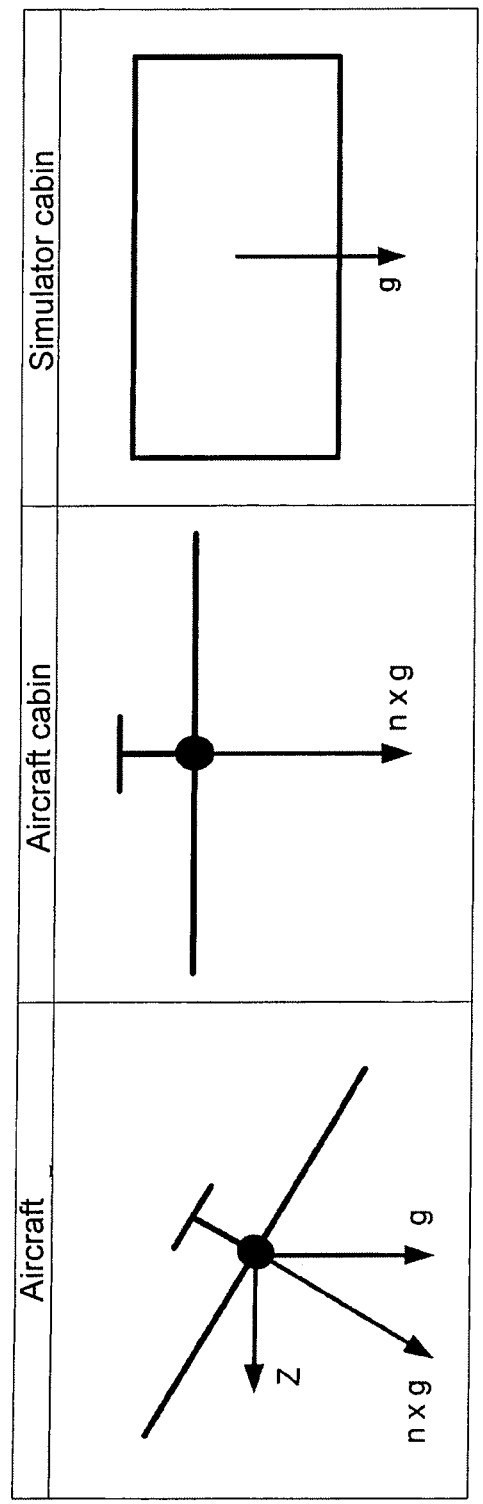
FIG. 8 shows a schematic illustration of the apparent perpendicular during a coordinated curve during flight.
Figure 9A:
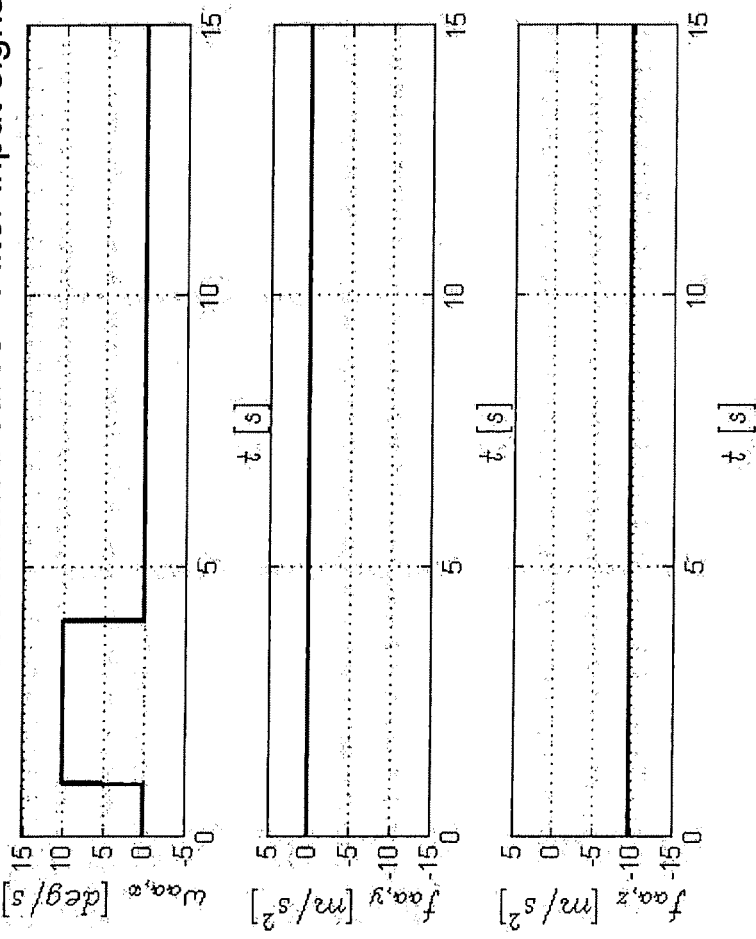
FIGS. 9a to 9d show schematic illustrations of the signal curves of the flight state of the coordinated curve.
Figure 9B:
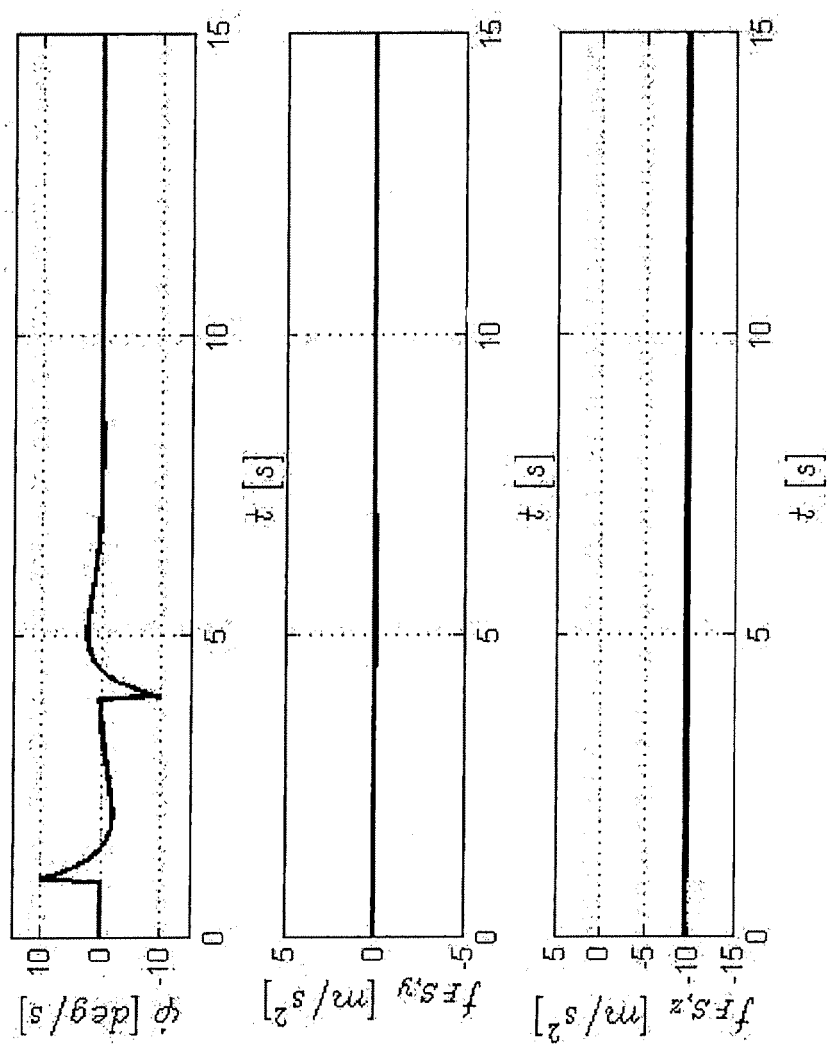
Figure 9C:
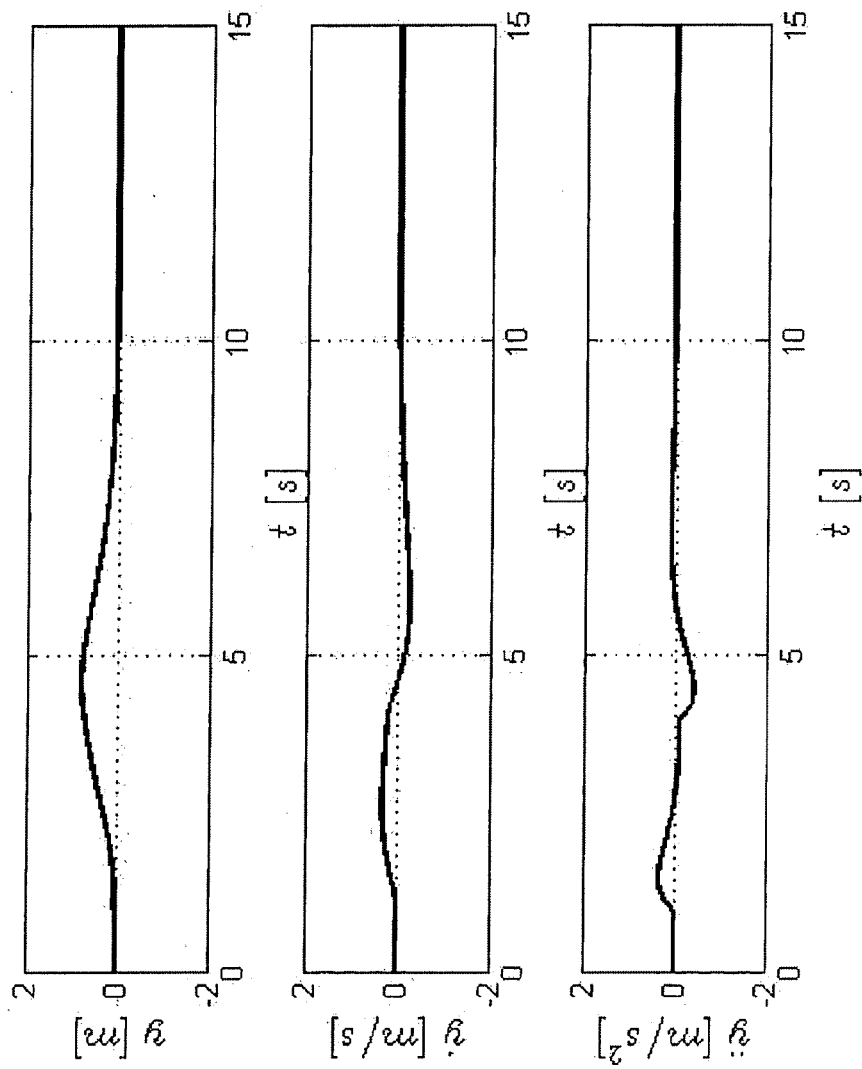
Figure 9D:
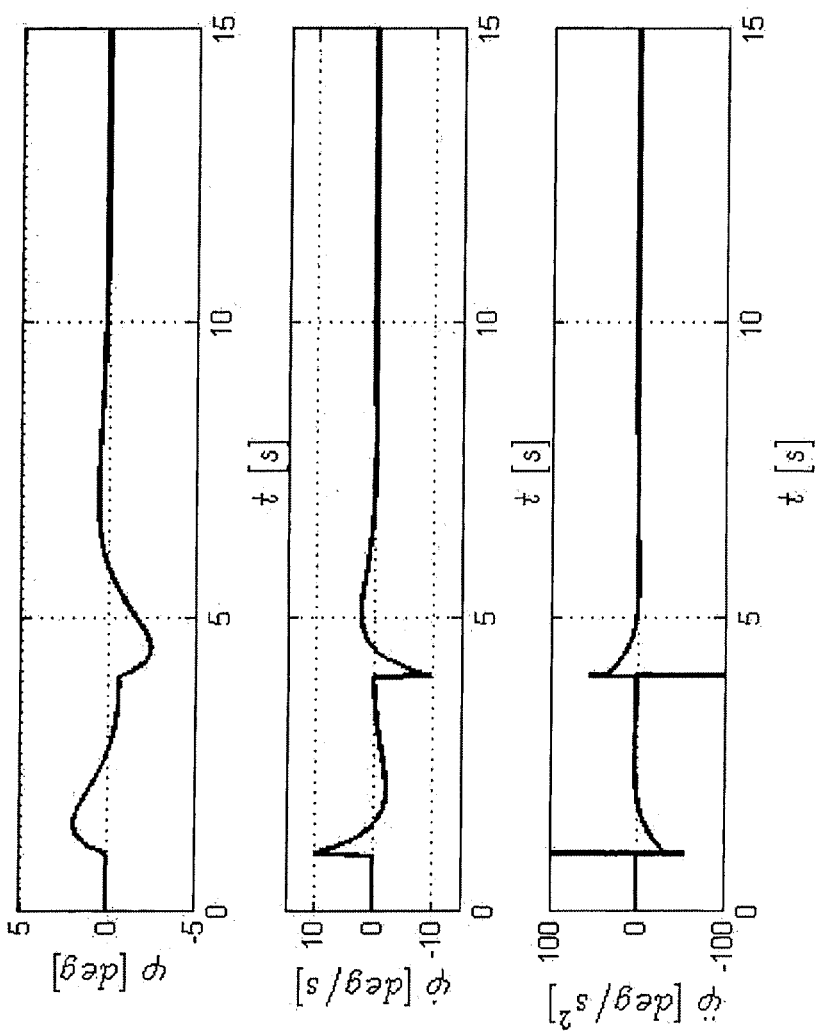

In a manner analogous to FIGS. 5a to 5d, FIG. 7a shows the input signals in the filters, FIG. 7b shows the output signals, FIG. 7c shows the translational movements, and FIG. 7d shows the rotational movements.

Case 3: Coordinated Curve.

In the third case, the aircraft is in a sideslip-free curved flight. A roll angle ensures the compensation of the rotation of the apparent perpendicular caused by centripetal forces that act in addition to the weight force. For the pilot, the latter points in the direction of the vertical axis. The load multiplication that occurs cannot be represented for the aforementioned reasons. In principle, the simulator cabin could remain at rest during the entire maneuver, but this leads to an error during the entry and exit of the curve as no roll movement is perceivable. Therefore, at least a small rotation about the roll axis, which is exited again as unnoticeably as possible, is desirable.

If the aircraft is observed from the outside, a deviation arises here between the apparent perpendicular and in the perpendicular to the Earth, with the apparent perpendicular in this case corresponding to the vertical axis from the view of the aircraft cabin (central presentation). Accordingly, the simulator cabin remains unchanged, apart from the entry into and exit from the curve, which are compensated by a short roll movement.

FIGS. 9a to 9d show the corresponding input and output signals of the filter in an analogous manner.

LIST OF EMPLOYED INDICES AND SIGNS

| | Meaning |
|---|---|
| Index | |
| PA | Position of the pilots in the aircraft |
| PS | Position of the pilots in the flight simulator |

-continued

| Sign | Meaning |
|---|---|
| $\vec{a}_{aa}$ | Vector of the acceleration at the pilot seat in the aircraft |
| $\vec{f}_{aa}$ | Vector of the specific forces at the pilot seat in the aircraft |
| $f_{aa,x}$ | Specific force in the longitudinal direction at the pilot seat in the aircraft |
| $f_{aa,y}$ | Specific force in the lateral direction at the pilot seat in the aircraft |
| $f_{aa,z}$ | Specific force in the vertical direction at the pilot seat in the aircraft |
| $f_{PS,x}$ | Specific force in the longitudinal direction in the flight simulator |
| $f_{PS,y}$ | Specific force in the lateral direction in the flight simulator |
| $f_{PS,z}$ | Specific force in the vertical direction in the flight simulator |
| $\vec{f}_{t,PS}$ | Vector of the specific force as a consequence of translational acceleration in the flight simulator |
| $f_{x,t,PS}$ | Specific force in the longitudinal direction in the flight simulator as a consequence of longitudinal acceleration |
| $f_{y,t,PS}$ | Specific force in the lateral direction in the flight simulator as a consequence of lateral acceleration |
| $f_{z,t,PS}$ | Specific force in the vertical direction in the flight simulator as a consequence of vertical acceleration |
| $\vec{f}_{\omega,PA}$ | Vector of the specific forces at the pilot seat in the aircraft as a consequence of a position angle |
| $\vec{f}_{\omega,PS}$ | Vector of the specific forces at the pilot seat in the flight simulator as a consequence of a position angle |
| $f_{x,\omega,PA}$ | Specific force in the longitudinal direction at the pilot seat in the aircraft as a consequence of a position angle |
| $f_{y,\omega,PA}$ | Specific force in the lateral direction at the pilot seat in the aircraft as a consequence of a position angle |
| $f_{z,\omega,PA}$ | Specific force in the vertical direction at the pilot seat in the aircraft as a consequence of a position angle |
| $f_{x,\omega,PS}$ | Specific force in the longitudinal direction at the pilot seat in the flight simulator as a consequence of a position angle |
| $f_{y,\omega,PS}$ | Specific force in the lateral direction at the pilot seat in the flight simulator as a consequence of a position angle |
| $f_{z,\omega,PS}$ | Specific force in the vertical direction at the pilot seat in the flight simulator as a consequence of a position angle |
| $g$ | Gravitational acceleration |
| $\vec{g}_{PA}$ | Vector of the gravitational acceleration at the pilot seat |
| $\ddot{x}_f$ | Longitudinal acceleration in the coordinate system that is stationary in relation to the cabin |
| $\ddot{y}_f$ | Lateral acceleration in the coordinate system that is stationary in relation to the cabin |
| $y_{pp,sim}$ | Lateral acceleration at the pilot seat in the flight simulator |
| $\ddot{z}_f$ | Vertical acceleration in the coordinate system that is stationary in relation to the cabin |
| $\varphi_{PA}$ | Roll angle in the pilot seat of the aircraft |
| $\varphi_{PS}$ | Roll angle in the pilot seat of the flight simulator |
| $\theta_{PA}$ | Pitch angle in the pilot seat of the aircraft |
| $\theta_{PS}$ | Pitch angle in the pilot seat of the flight simulator |
| $\vartheta_{x,PA}$ | Rotation of the apparent perpendicular about the transverse axis in the aircraft |
| $\vartheta_{x,PS}$ | Rotation of the apparent perpendicular about the transverse axis in the flight simulator |
| $\vartheta_{\omega,PA}$ | Rotation of the apparent perpendicular about the transverse axis as a consequence of a pitch position in the aircraft |
| $\vartheta_{\omega,PS}$ | Rotation of the apparent perpendicular about the transverse axis as a consequence of a pitch position in the flight simulator |
| $\vartheta_{t,PS}$ | Rotation of the apparent perpendicular about the transverse axis as a consequence of translational acceleration in the flight simulator |
| $\varphi_f$ | Rotation of the apparent perpendicular as a consequence of specific forces in the lateral direction |
| $\varphi_{ypp}$ | Equivalent apparent perpendicular angle about the longitudinal axis for a lateral acceleration |
| $\varphi_{y,PA}$ | Rotation of the apparent perpendicular about the longitudinal axis in the aircraft |
| $\varphi_{\omega}$ | Rotation of the apparent perpendicular about the longitudinal axis as a consequence of a roll position |
| $\varphi_{t,PS}$ | Rotation of the apparent perpendicular about the longitudinal axis as a consequence of a translational acceleration in the flight simulator |
| $\vec{\varphi}_{PA}$ | Vector of the rotation of the apparent perpendicular at the pilot seat in the aircraft |
| $\vec{\varphi}_{PS}$ | Vector of the rotation of the apparent perpendicular at the pilot seat in the flight simulator |
| $\vec{\varphi}_{t,PA}$ | Vector of the rotation of the apparent perpendicular as a consequence of a translational acceleration at the pilot seat in the aircraft |
| $\vec{\varphi}_{t,PS}$ | Vector of the rotation of the apparent perpendicular as a consequence of a translational acceleration at the pilot seat in the flight simulator |
| $\vec{\varphi}_{\omega,PA}$ | Vector of the rotation of the apparent perpendicular as a consequence of a position angle at the pilot seat in the aircraft |
| $\vec{\varphi}_{\omega,PS}$ | Vector of the rotation of the apparent perpendicular as a consequence of a position angle at the pilot seat in the flight simulator |
| $\dot{\vec{\omega}}_{aa}$ | Vector of the rotational accelerations in the aircraft |
| $\vec{\omega}_{aa}$ | Vector of the rotational speeds in the aircraft |
| $\dot{\omega}_{aa,x}$ | Rotational acceleration around the longitudinal axis in the aircraft |
| $\dot{\omega}_{aa,y}$ | Rotational acceleration around the transverse axis in the aircraft |
| $\dot{\omega}_{aa,z}$ | Rotational acceleration around the vertical axis in the aircraft |
| $\omega_{aa,x}$ | Rotational speed about the longitudinal axis in the aircraft |
| $\omega_{aa,y}$ | Rotational speed about the transverse axis in the aircraft |
| $\omega_{aa,z}$ | Rotational speed about the vertical axis in the aircraft |

The invention claimed is:

1. A method for actuating a simulator for simulating translational and rotational movements of a vehicle, wherein, in relation to a three vehicle axes, a rotational rate about a first vehicle axis and specific forces respectively acting along a second vehicle axis and a third vehicle axis are provided from a movement model that simulates the vehicle and converted into translational and rotational control commands for actuating the simulator, comprising the following steps:

calculating, using a control unit, a rotational angle from the rotational rate about the first vehicle axis, calculating, using the control unit, from the specific forces, an apparent perpendicular angle between a vertical axis as the third vehicle axis and the apparent perpendicular arising on account of the specific forces acting along the second vehicle axis and third vehicle axis, calculating, using the control unit, an apparent perpendicular angle difference between a rotational angle and the apparent perpendicular angle and ascertaining a high-frequency difference component of the apparent perpendicular angle difference that is intended to be compensated by a translational movement of the simulator, depending on the apparent perpendicular angle difference, calculating, using the control unit, translational control commands for actuating the simulator for a translational movement of the simulator along the second vehicle axis, depending on the ascertained high-frequency rotational angle component of the apparent perpendicular angle difference, calculating, using the control unit, a compensation angle that corresponds to an acceleration value to be simulated along the second vehicle axis by inclining the simulator in relation to perpendicular to the Earth, depending on the rotational angle, the high-frequency difference component of the apparent perpendicular angle difference and the apparent perpendicular angle, calculating, using the control unit, a limited compensation angle from the compensation angle by means of a physiological rotational rate limitation, which restricts an inclination of the simulator below a perception threshold, and calculating, using the control unit, rotation control commands for actuating the simulator for a rotational movement of the simulator about the first vehicle axis, depending on the limited compensation angle and the rotational angle.

2. The method as claimed in claim 1, wherein the high-frequency difference component of the apparent perpendicular angle difference is ascertained by means of a high-pass filter.

3. The method as claimed in claim 1 wherein the translational control commands for translational movement of the simulator along the second vehicle axis is calculated from a product of the gravitational acceleration and a sine of the ascertained high-frequency difference component of the apparent perpendicular angle difference.

4. The method as claimed in claim 1 wherein the compensation angle is calculated from a sum of the rotational angle and the high-frequency difference component of the apparent perpendicular angle difference minus the apparent perpendicular angle.

5. The method as claimed in claim 1 wherein the rotational control commands for a rotational movement of the simulator about the first vehicle axis are calculated from a sum of the limited compensation angle and of the rotational angle.

6. The method as claimed in claim 1 wherein the limited compensation angle is calculated by means of a physiological rotational rate limitation, depending on the compensation angle and the rotational rate that is provided from the movement model, wherein a restriction value for limiting the compensation angle is ascertained depending on a predetermined minimum restriction value and a high-frequency rotational rate component of the rotational rate.

7. A simulator for simulating translational and rotational movements of a vehicle, which comprises:
 a platform that is movable in relation to a stationary reference plane by means of actuators; and
 a control unit that is configured to carry out the method as claimed in claim 1 for actuating the simulator.

8. The simulator as claimed in claim 7, wherein the simulator is a hexapod.

9. A computer program comprising program code means, configured to carry out the method as claimed in claim 1 when the computer program is executed on a computer.

* * * * *